R. Bullard.
Honey Comb Frame.
Nº 34,463.
Patented Jan. 4, 1861.
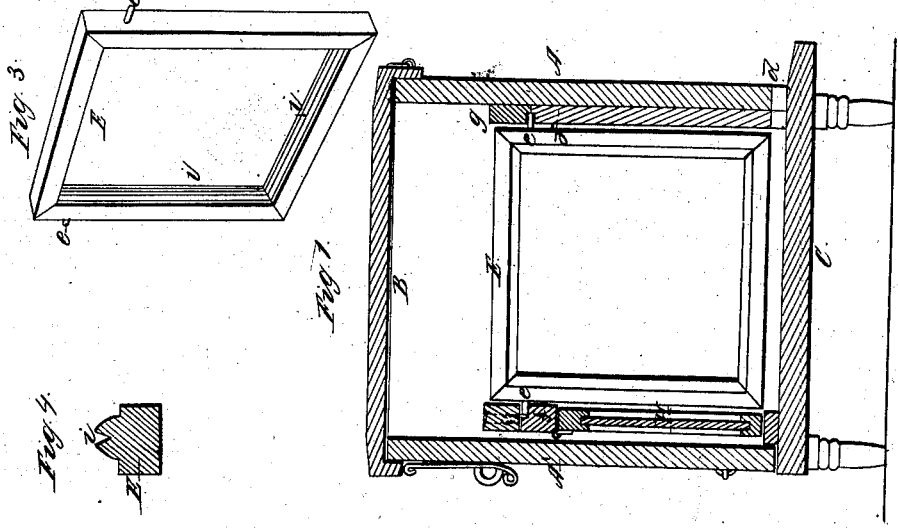
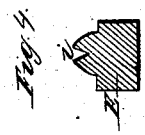
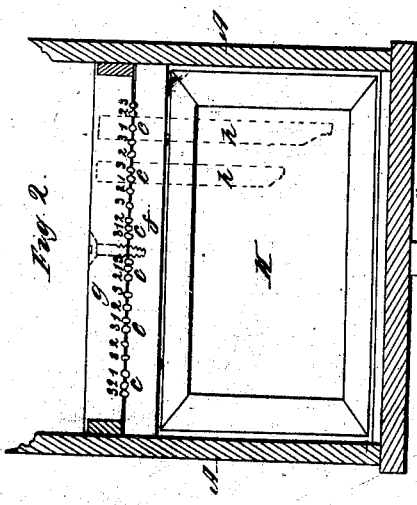
Witnesses:
Chas L Spencer
S J Allis
Inventor:
Ransom Bullard
By his attorney J Fraser

UNITED STATES PATENT OFFICE.

RANSOM BULLARD, OF LITCHFIELD, MICHIGAN.

BEEHIVE.

Specification of Letters Patent No. 32,463, dated June 4, 1861.

*To all whom it may concern:*

Be it known that I, RANSOM BULLARD, of Litchfield, in the county of Hillsdale and State of Michigan, have invented a new and Improved Method of Constructing Beehives; and I do hereby declare that the following is a full and exact description thereof; reference being had to the accompanying drawings, making part of this specification, in which—

Figure 1. is a vertical section of my improved hive. Fig. 2. is a transverse vertical section, the top being broken away. Fig. 3. is a perspective view of one of the comb-frames detached. Fig. 4. is a cross section of one of the pieces which compose the comb-frames.

Like characters designate corresponding parts in all of the figures.

As represented in the drawings, my improved hive consists of a box, square or nearly so, of which A A indicate the sides and B the top, which is hinged at one edge to enable it to be raised, and secured by a hasp and staple e, on the back. The bottom, C, may be supported on short legs, or otherwise raised from the platform on which it stands. The front side projects to afford the bees a place to alight before entering the passage d, which communicates with the brood chamber. The back side A', is hinged so that it may be thrown open when the top is raised, and expose the interior.

The comb frames E, consist of rectangular frames of suitable thickness, and of a size nearly equal to the interior dimensions of the hive, though somewhat shorter, so as to leave a space above them which may be filled with removable honey boxes during the working season. The interior face of the frames is worked with a molding, the figure of which is an astragal, with a V-groove sunk in its center, the purpose of which will be hereinafter explained. The frames are provided with two pivots, e e, placed at opposite points in two of their outer edges, and near the upper corners, that the chief weight of the frames will be below them, so that they shall be suspended vertically when resting on these pivots. On the front and back sides of the hive cleats f f are provided, which are divided into spaces by notches c c, Fig. 2, in their upper edges, as guides to receive the pivots of the frames E. A cap-cleat, g, covers each, the under side of which is provided with notches corresponding in position with those of f. The notches are so arranged in number and position as to receive a greater or less number of frames, as may be required at different times, and keep them at equal or nearly equal distances apart. Young swarms that are large will always, when the honey harvest is bountiful, construct their combs thicker than when the harvest is light, therefore the number of the frames should be reduced in order that more space may be left between them. Eight or ten is the number that I ordinarily use in a hive of common size, and when they become filled with honey I remove such as I wish, and place the remaining ones at equal distances apart. The removal and change are easily effected by drawing the single screw from the cap g when it can be removed and the frames E, taken out, or their position changed, with the utmost facility. If I leave but six frames in the hive, I place them with their pivots in the notches numbered 1, and they are uniformly arranged; if there be eight I place them in notches, 2; if ten, the notches 3, adjust them properly. The notches may be varied in position as much as the increased number of frames in a larger hive will require.

The position which the frames occupy in Fig. 2, is indicated by the dotted lines, h h. From being suspended on the pivots they always maintain a perpendicular position, whether the hive stands level or not, and in taking out may be moved and adjusted in such a manner that the combs will not be broken by contact with each other, or with the sides of the hive.

A glass door F occupies the back of the hive, to afford an opportunity for observation, and it is hinged at the top so that it may be opened by raising it for the removal of dead bees and filth, or any other purpose for which it may be required.

The disadvantages of an astragal face to the comb frames is well known to apiarians, as it enables the sections of comb to be more firmly secured than on a plane surface, so that it is not liable to be detached in handling and moving; but it fails to insure regularity in the direction in which the combs are built, which is the object of the V-shaped channel i, Fig. 4. This in combination with the astragal, has been found in a great number of experiments to induce the bees to build their comb perfectly regular and mechanically correct in relation to the frames. The well known custom of rubbing warm bees-wax on the parts to which the combs are to be attached may here be applied by rubbing it over the V-channel and afterward scraping the surface so as to leave the channel filled with wax. This will save the bees much labor, by laying the foundation of their structure for them, but either with or without this preparation the channel proves a sure guide to regularity. The bees work their wax around the shoulder of the astragal in either direction from the channel, so that the greatest amount of strength consistent with the nature of the material is obtained. Where the channel $i$ has been placed obliquely of the frames, or deflected from its course, the combs have been found to unerringly follow its direction. This discovery exempts the apiarian from the great annoyance and damage of having the combs built irregularly, and the space in his hives imperfectly filled in consequence, and to a great extent from having them broken in removing.

My hive is characterized by the utmost simplicity of form and structure consistent with its uses.

What I claim as my invention and desire to secure by Letters Patent, is—

1. The combination and arrangement of the comb-frames E, suspended by a single pivot on each side, with the slats $f$ $f$, and removable caps $g$ $g$, provided with the notches, or series of notches $c$ $c$, substantially in the manner and for the purposes herein shown and described.

2. The acute or V-shaped channel in combination with an astragal face or its equivalent, substantially as and for the purposes set forth.

RANSOM BULLARD.

Witnesses:
E. THORNTON,
BENJAMIN GILLETT.